(12) United States Patent
Cornell

(10) Patent No.: US 7,108,569 B2
(45) Date of Patent: Sep. 19, 2006

(54) AXIAL FLOW PUMP OR MARINE PROPULSION DEVICE

(76) Inventor: Donald E. Cornell, 7655 Callen Ct., New Port Richey, FL (US) 34654

( * ) Notice: Subject to any disclaimer, the term of this patent is extended or adjusted under 35 U.S.C. 154(b) by 295 days.

(21) Appl. No.: 10/801,705

(22) Filed: Mar. 17, 2004

(65) Prior Publication Data

US 2005/0142001 A1    Jun. 30, 2005

Related U.S. Application Data

(60) Provisional application No. 60/455,578, filed on Mar. 19, 2003.

(51) Int. Cl.
B63H 11/00 (2006.01)
(52) U.S. Cl. .............. 440/1; 440/38; 440/47
(58) Field of Classification Search ............ 440/1, 440/38, 47
See application file for complete search history.

(56) References Cited

U.S. PATENT DOCUMENTS

| | | | |
|---|---|---|---|
| 3,405,526 A * | 10/1968 | Aschauer | 60/221 |
| 3,482,402 A * | 12/1969 | Anthoney, Sr. | 60/221 |
| 5,222,863 A * | 6/1993 | Jones | 415/199.5 |
| 5,338,234 A | 8/1994 | Nanami | |
| 5,490,768 A * | 2/1996 | Veronesi et al. | 417/356 |
| 5,562,405 A | 10/1996 | Ryall | |
| 5,623,823 A * | 4/1997 | Schirle et al. | 60/226.3 |
| 5,634,831 A | 6/1997 | Davies et al. | |
| 5,660,536 A | 8/1997 | Karls et al. | |
| 5,755,554 A | 5/1998 | Ryall | |
| 6,004,173 A * | 12/1999 | Schott | 440/38 |
| 6,027,383 A * | 2/2000 | Broinowski | 440/38 |
| 2002/0182947 A1 | 12/2002 | Ishigaki | |
| 2003/0032347 A1 | 2/2003 | Freitag et al. | |
| 2003/0064638 A1 | 4/2003 | Fuse et al. | |

OTHER PUBLICATIONS

Web Pages of "Phoenix Navigation & Guidance, Inc." describing Phoenix Vortex Drive. Publication date(s) unknown. 15 pages.
Web pages of "Hamilton Jet" describing HJ292. 3 pages. Publication date(s) unknown.

* cited by examiner

*Primary Examiner*—Stephen Avila
(74) *Attorney, Agent, or Firm*—McIntyre Harbin & King

(57) ABSTRACT

A multistage axial-flow pumping or marine propulsion device having fixed or variable pitch stators between rotors. Stator vanes are designed to lower internal fluid speed without sacrificing total pressure as working fluid travels toward the discharge nozzle. A variable pitch stator controls the amount of energy, i.e., torque, imparted to the working fluid at successive rotor sections. A variable inlet guide vane provides throttling of mass flow rate independently of rotor speed. An exit guide vane provides flow straightening and pressure maintenance at the discharge nozzle. A variable area throat at the discharge nozzle controls the exit velocity of the water jet according to boat speed and/or desired propulsive efficiency. Advantageously, the device enables a shipmaster to set performance characteristics of a vessel at any desired speed, loading, horsepower setting, or operating characteristic of the power plant.

18 Claims, 10 Drawing Sheets

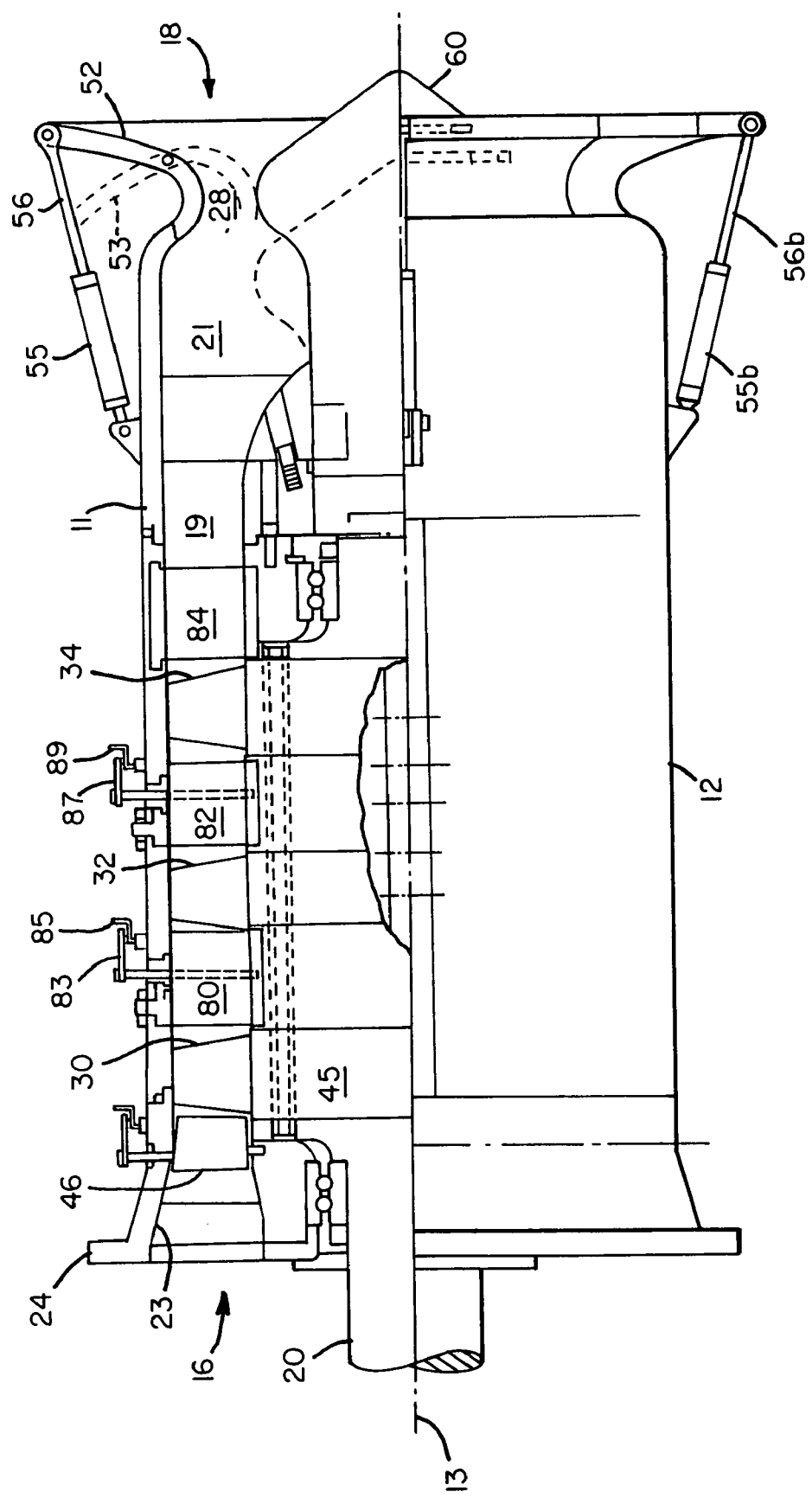

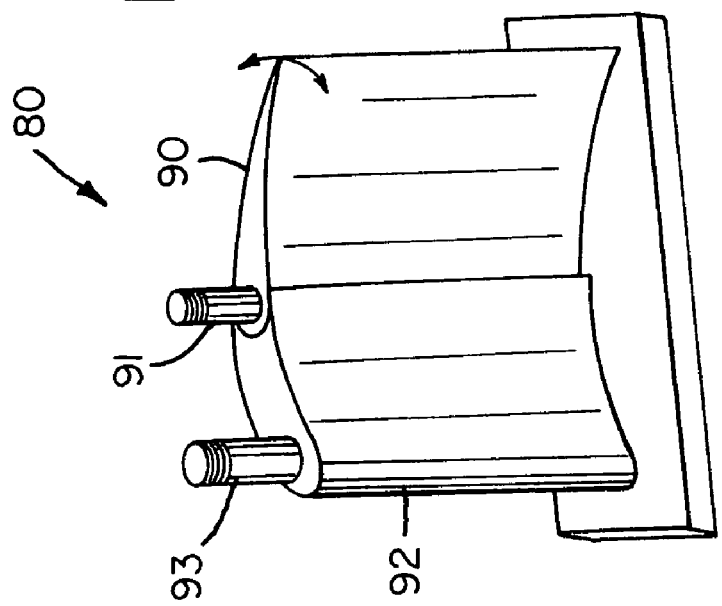
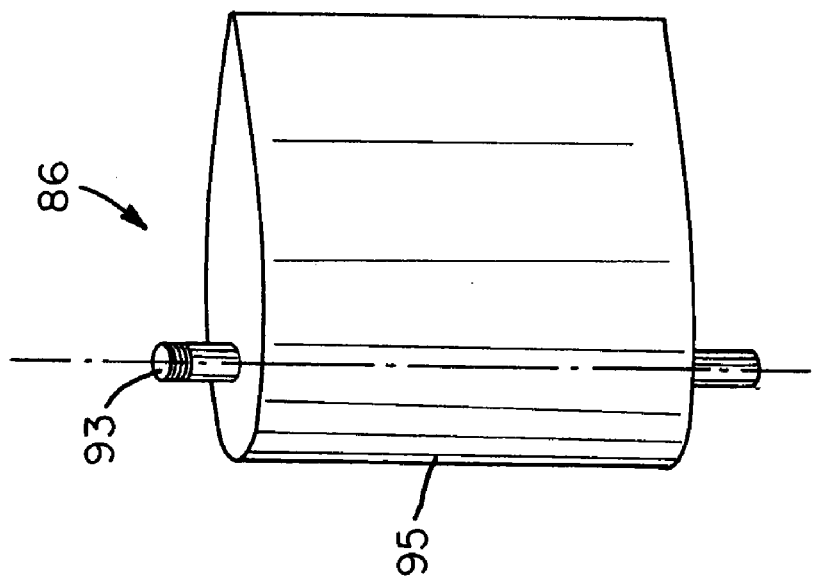

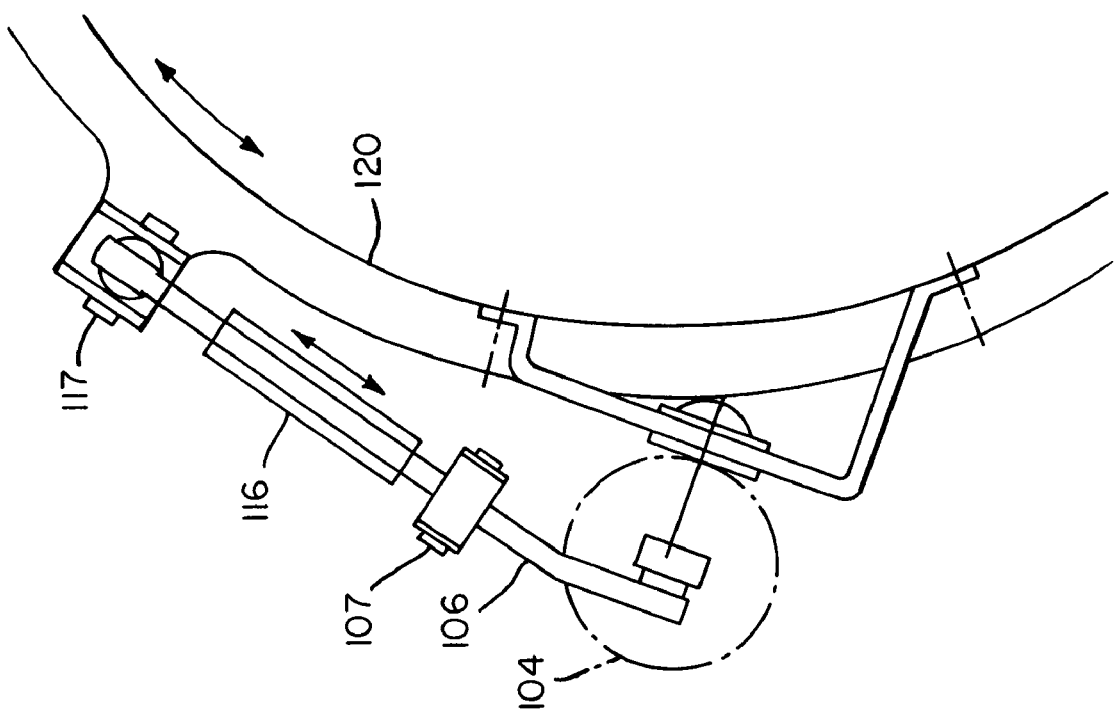

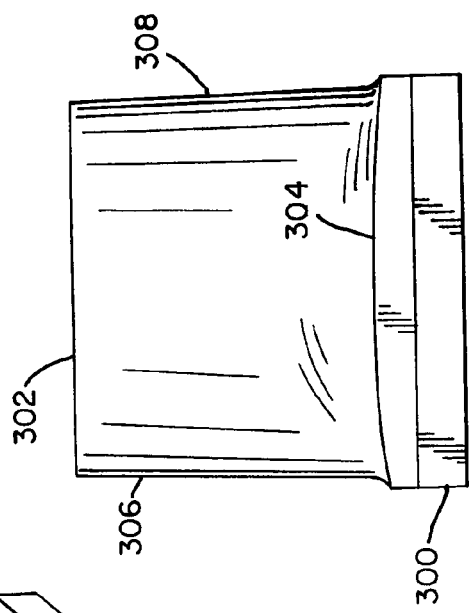
FIG. 9B
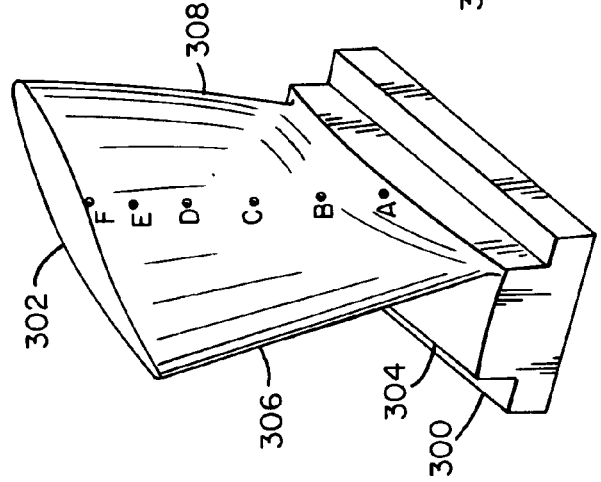
FIG. 9A
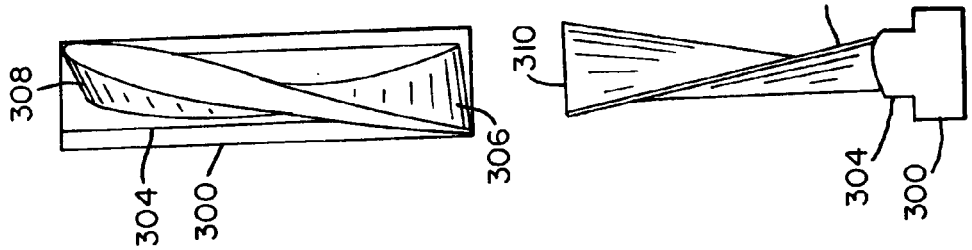
FIG. 9D
FIG. 9C

AXIAL FLOW PUMP OR MARINE PROPULSION DEVICE

CROSS-REFERENCE TO RELATED PATENT APPLICATION

This invention claims the benefit of Provisional Application No. 60/455,578 filed Mar. 19, 2003 entitled High-Speed Axial-Flow Marine Propulsion System and Method With Variable Inlet and/pr Variable Exhaust Nozzle.

BACKGROUND

The present invention relates to a fluid pumping device, and additionally, to a high-efficiency, axial flow marine propulsion system.

In a multistage axial flow pump, i.e. two or more stages, energy is transferred from a prime mover or engine to the working fluid (e.g., water) at each stage. Pressure is increased at each succeeding stage until the working fluid is exhausted through a discharge nozzle to generate thrust. Increased pressure inside the pump tends to suppress damaging cavitation that may otherwise act upon the impellers. This differs from a conventional centrifugal or mixed-flow pumping device that is generally limited to single stage and consumes a relatively large volume. Apart from marine propulsion, other large-scale pumping applications of the invention include fire control, flood control, irrigation, and in large cooling towers.

An axial-flow pumping device used in marine propulsion, for example, might include an outer casing or housing, a water inlet, a shaft-driven impeller section, and an outlet or discharge nozzle. Such devices were either single stage or provided counter-rotating rotors in two stages. Counter-rotating rotors, however, presented myriad mechanical problems and were difficult to service. The impeller section included multiple radially aligned rotor blades mounted on a rotating wheel or rotor that forced water from the inlet to the outlet. Power was derived from a conventional power plant, such a piston-driven gasoline or diesel engine, a gas or steam turbine engine, or any combination thereof. A drive shaft and sometimes, a gear reduction mechanism, coupled the prime mover to the impeller section of the pumping device to convert rotary power to thrust.

Most engines, however, have only one optimum operating speed that delivers peak horsepower or peak efficiency, but the operating speed may not optimally match the desired thrust and/or hull speed of the vessel, which varies with loading of the vessel, fluid density, fluid temperature, or other conditions. A fully loaded vessel, for example, has a different optimum operating speed than a lightly loaded vessel. Thus, certain inefficiencies inherently exist in prior power plant-thruster combinations.

To compensate for inefficiencies, prior axial flow devices employed variable pitch rotor blades in the impeller section to match the optimum torque, speed, or fuel efficiency of the prime mover. It is known in a prior pumping device, but not necessarily applied to marine propulsion, to include fixed stator vanes between impeller sections of a multi-stage pumping device to counteract whirl or rotational velocity that the rotor blades impart to the fluid, such as that disclosed by U.S. Pat. Nos. 5,755,554 and 5,562,405 (both issued to Ryall). The stator vanes had the effect of redirecting fluid flow to maintain a desired angle-of-attack of rotor blades in the succeeding stage while the rotor blades worked against the whirling fluid, but such prior stator vane designs significantly increased internal friction. It was not known, however, to provide variable pitch stator vanes in prior systems to efficiently compensate for pressure, velocity (propulsor or vessel), or torque fluctuations. Ryall, for example, provides a substantially constant absolute velocity in flow passages between fixed stator blades. Due to their geometric structure, prior stator vane designs did not maintain or increase static pressure between rotor sections, and therefore, endured other losses in efficiencies. Such prior systems generally operated, at best, around 65 to 72% propulsive efficiency.

The pumping or propulsion device of the present invention, however, uses multiple rotor-stator stages that include geometrically efficient blades and vanes, e.g., an airfoil shape, to minimize internal drag and to successively increase static pressure of the working fluid at each stage of the device. Because fluid velocity decreases across the stator vanes, static pressure increases thereby improving overall efficiency of the device. Variable-pitch stator vanes may also be employed to further improve efficiency since pitch angle changes altered the angle of attack of working fluid against rotor blades in the succeeding section. Varying the angle of attack impacted the torque required by the prime mover to drive the pump.

Preferably, the rotor blades in each section of a preferred multi-stage pump or propulsion device are fixed-pitched thereby obviating mechanical problems typically associated with variable-pitch rotor blades. Thin, low-drag stator vanes, fixed or variable-pitch, are also preferred to minimize internal drag. Advantageously, the improved multistage structure has a simpler mechanical construction, has a larger thrust-weight ratio, is more easily serviced and maintained, and importantly, achieves greater propulsive efficiencies, i.e., in the range of 84 to 90% (or more), regardless of the thrust and/or hull speed set points. When deployed in marine propulsion, the present invention may additionally include a variable area discharge nozzle, i.e., a controllable throat area, to optimally match vessel speed with the discharge speed of the water jet for any given or desired thrust or power setting. This enables the vessel to operate at maximum propulsive efficiency over a wide range of speeds thereby conserving precious fuel and increasing range.

SUMMARY OF THE INVENTION

A first aspect of the invention comprises a multistage axial flow device that includes an outer housing or casing, preferably cylindrical, an substantially annular chamber within said housing to convey a substantially incompressible working fluid (e.g., water) from an inlet to an outlet where each stage includes a rotor section and a stator section positioned downstream of the rotor section. The stator vanes are fixed relative to housing and have a geometrical shape to define a flow path having a cross-sectional area that increases from an entry point to an exit point of the stator section whereby to stepwise increase static pressure of the working fluid at successive stator stages. Optionally, the stator vanes have variable pitch. The discharge nozzle area may also be convergent to increase velocity of fluid discharged from the outlet. In an additional aspect of the invention, the discharge nozzle has a variable area throat, which is controlled to optimally match the speed of the vessel with the water jet discharge speed. In yet a further aspect of the invention, the axial flow device includes a variable inlet guide vane that, among other things, controls or "throttles" inlet fluid flow by changing the inlet area and swirl angle of water entering the inlet. This enables the device to match a wide range of prime movers of different power.

In another aspect of the invention, there is provided an axial flow device mounted in a vessel to propel the vessel through water. This aspect comprises an axial flow casing, an annular chamber within the casing that conveys water from an inlet to an outlet, multiple rotor-stator stages that each include a rotor section and a stator section positioned downstream of the rotor section wherein the stator section includes plural vanes at spaced locations within the chamber to define a flow passage between respective vanes each having a cross-sectional area normal to a direction of flow that increases from an entry point to an exit point of the stator section, and a variable area discharge nozzle responsive to the discharge velocity of water and the velocity of the vessel to alter the area of the discharge throat according to a desired operating set point. Optionally, the stator vane may have variable pitch. Further, the device may be equipped with a variable inlet guide vane stage having plural variable pitch inlet guide vanes to redirect inlet fluid flow.

In yet another aspect of the invention, there is provided a method of conveying a substantially incompressible working fluid in an axial flow device comprising defining a flow path in the device to convey working fluid from an inlet to an outlet, providing multiple stages within the flow path that each include a rotor section and a stator section following the rotor section, driving the working fluid through the flow path by rotating the rotor section, and altering static pressure of the working fluid in the stator section by providing a flow path having a cross-sectional area that increases as working fluid travels between vanes of the stator section. Optionally, the method may further include varying the pitch of the stator vanes and/or throttling fluid flow at the inlet by altering the pitch of variable inlet guide vanes. In addition, the method may further include providing an exit guide vane stage operative to further increase static pressure and/or straighten the flow of the working fluid prior to discharge.

In yet a further aspect of the invention, there is provided a method of controlling the discharge velocity of water from an axial flow device relative to the water speed a vessel where the method comprises detecting discharge velocity of water at the throat of the axial flow device, detecting the water speed of the vessel, providing a variable throat area at the discharge nozzle of the axial flow device, and utilizing the discharge velocity and the speed of the vessel to control the size of the throat area of the discharge nozzle according to a desired propulsive efficiency or performance set point. In addition, the method may further include providing an actuator that varies the throat area of the discharge nozzle, detecting respective pressures associated with the discharge velocity and speed of the vessel, and using the respective pressures to drive the actuator to an equilibrium position that defines a desired optimum throat area of the discharge nozzle.

These and other aspects of the invention will become apparent upon review of the following description taken in connection with the accompanying drawings. The invention, though, is pointed out with particularity by the appended claims.

BRIEF DESCRIPTION OF THE DRAWINGS

FIG. 3 shows a partial cut-away view of an alternative design of a multistage propulsion or pumping device according to yet a further aspect of the present invention, which includes variable pitch stator vanes to improve the operating efficiency.

FIG. 4 shows a second, segmented stator vane design that may be incorporated in the pumping or propulsion device shown in FIG. 3, according to yet another aspect of the present invention.

FIG. 5 shows a first stator vane design that may be incorporated in the pumping or propulsion device shown in FIG. 3, according to yet another aspect of the present invention.

FIG. 7A shows a front view of one embodiment of a control ring and actuator that may be used to control the pitch of the variable pitch stator vanes of an axial flow pumping or propulsion device according to yet a further aspect of the present invention.

FIG. 9A is a rear perspective view of an exemplary rotor blade the may be used with the illustrative pump or propulsion device.

FIG. 9B is a side view of the rotor blade of FIG. 9A.

FIG. 9C is a rear view (viewed from a downstream position) of the exemplary rotor blade of FIG. 9A.

FIG. 9D is a top view of the exemplary rotor blade of FIG. 9A.

DESCRIPTION OF ILLUSTRATIVE EMBODIMENTS

Figure 1:
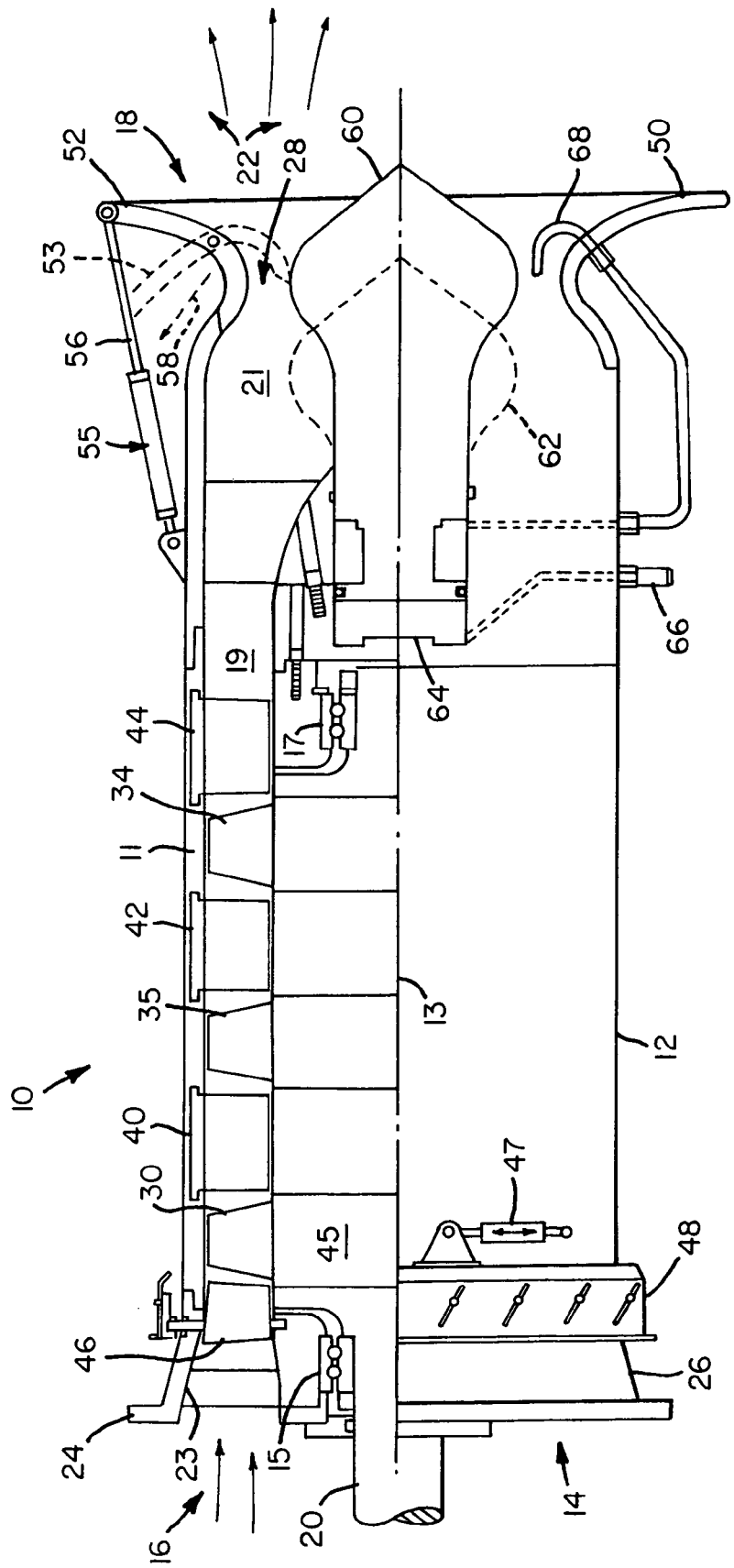
FIG. 1 depicts partial cut-away view of a multistage axial flow propulsion or pumping device that includes three rotor-stator stages, variable geometry inlet guide vanes, a thrust reversing/steering mechanism, variable-area discharge nozzle, and a mechanism to control the discharge area according to one embodiment of the present invention.

FIG. 1 shows a first embodiment of a pumping or propulsion device 10 having a substantially cylindrical outer casing 12, an inlet 14 through which a substantially incompressible working fluid (e.g., sea water) enters, and an outlet 18 that discharges the working fluid as an accelerated jet discharge 22. In marine applications, the working fluid is water. Device 10 includes an internal annular chamber 19 extending along and circumscribing an axis 13. Chamber 19 conveys working fluid from inlet 14 to outlet 18 under power delivered by multiple stages each of which comprises a rotor section and a stator section. Respective rotor sections of device 10 include a rotor blade 30, 32, or 34 attached to a corresponding rotating wheel, such as wheel 45 centered on axis 13. Blade 30 is attached to wheel 45. Multiple concatenated wheels and the internal wall of casing 11 define the annular chamber 19 within the cylindrical housing of device 10. Although cylindrical is preferred, housing 12 though may have a non-cylindrical shape.

The concatenated wheels are driven by drive shaft 20, which may be coupled of any one of a number of conventional engines. Mounting flange 24 couples device 10 to a fluid conduit that supplies working fluid to device 10. A set of forward and aft sets of thrust bearings 15 and 17 support the shaft along axis 13 within casing or housing 12. Thrust bearing 15 and 17 also absorb or counteract a relatively large amount of opposing axial force between housing 12 and shaft 20 developed by multiple rotor sections during operation of the device. Preferably, each of the rotor blades 30, 32, and 34 radially extends from axis 13 of an associated rotating wheel to a given design height, width, thickness, and twist angle so as to impart maximum energy to a working fluid.

Stator vanes 40, 42, and 44 lay in respective stator sections following respective rotor sections but are instead fixedly attached relative to wall 11 of the casing or housing 12, rather than being attached to a rotating wheel. Vane design is similar to the blade design of the rotors. Stator vanes 40, 42, and 44 serve to redirect and/or diffuse the flow of working fluid from the rotor blades, e.g., rotor blades 30, 32, and 34, in the preceding section. In operation, rotor blades impart energy to the working fluid by accelerating fluid in a tangential direction relative to axis 13, thus increasing the ram or impact pressure of the fluid as it enters the next stage. The stationary vanes redirect the working fluid in an opposed tangential direction, e.g., to counteract whirl imparted by the preceding rotor section, as the fluid flows in annular chamber 19 along axis 13 towards outlet 18.

According to an important aspect of the invention, the stator vanes are arranged to effectively reduce the velocity of the working fluid by providing an expanding area between vanes as fluid flows through the stator section. In part, this is accomplished by providing, in embodiments illustrated in FIGS. 4 and 5, an airfoil-shaped stators (with or without a segmented flap portion) having a thicker leading edge portion and a thinner trailing edge portion. Other geometric shapes achieving the same or similar results may also be utilized. In one practicable embodiment, the flow path area in a direction of fluid flow through the stator section may increase, for example, from a factor of about 1.15 to 1.5 (e.g., 23%), more or less. Such expanding flow path area between stator vanes correspondingly decreases the working fluid speed and simultaneously increases the static pressure of the fluid prior to entry into the next rotor stage. Fluid velocity decreases proportionately, more or less. However, total pressure of the fluid, i.e., static pressure plus impact or ram pressure imparted by the preceding rotor section, remains relatively constant (except for minor frictional losses) within the stator section. Thus, the geometric arrangement of the stator vanes relative to fluid flow enables a speed reduction of the working fluid without sacrificing total pressure, thereby obviating internal frictional and flow losses associated with higher fluid speeds. The arrangement of the stator vanes also increases static pressure of the fluid prior to the next stage thereby providing a higher initial static pressure upon which the rotor blades works to impart energy. Thus, the rotor blades in effect deliver further impact energy to the working fluid by increasing pressure derived from the preceding stage. Successive increases in static pressure provided by the stator sections and successive recovery and supplementation of impact energy provided by the rotor sections significantly increase the final working fluid pressure at the discharge nozzle and thus significantly increase the overall effectiveness of the pump or propulsion device.

Preferably, device 10 has three or more stages although two stages may also suffice. Fluid enters the next or succeeding stage at essentially the same total pressure of the fluid being discharged from the preceding stage. The rotor sections impart pressure to the fluid at each stage. Stepwise increases in pressure is repeated as many times as necessary to attain the desired design point pressure at region 21, which supplies pressurized fluid to an annular discharge nozzle. The discharge nozzle includes an axially variable plug 60 that controls the size of the area of throat 28 between deflector 52 and plug 60. Preferably, region 21 defines an annular nozzle that is convergent to eject water at an increased velocity thereby generating propulsive thrust. Thrust, which can be measured in pounds, equals mass flow times velocity.

In the preferred embodiment, the size or area of throat 28 in the annular discharge nozzle is variable and controllable, and may be used to trim the water jet discharge velocity to maximize boat velocity.

Inlet 16 of device 10 preferably includes a series of inlet guide vanes 46 that serve to control, redirect, or throttle incoming fluid flow and/or to change the angle of attack of incoming fluid. This alters the load on the rotor blades in the first stage of device 10. Due to differential cross sectional areas of inlet duct 26, the velocity of water at entry into the inlet duct is lower than the velocity of the water entering the casing of device 10. In the inlet duct, there is a transition section 23 from larger to smaller area so that the difference is not abrupt causing losses from eddies and thereby maintaining streamline flow. A principal embodiment of the invention does not require inlet guide vanes 46 in the first stage although other embodiments do. In a fixed inlet guide vane embodiment, the vanes direct water flow into the first rotor-stator stage 30, 40 at a prescribed angle and function as a flow director. In an embodiment utilizing variable inlet guide vanes, i.e. variably controlled vanes actuated by actuator ring 48 and actuator 47, the flow angle of water entering the first rotor stage of blade 30 is variable. This not only changes the incidence angle of the working fluid but also the amount of flow and therefore the inlet guide vanes function as a throttling mechanism. Thus, guide vanes 46 provide mass flow throttling of the working fluid, and include control linkage to rotate the vanes 46 about ±30° from a neutral position according to a desired mass flow rate.

At the discharge end of device 10, the axial position of nozzle plug 60 is controllable to effectively open or restrict the water jet throat area 28. When plug 60 is extended, as shown in FIG. 1, the area of throat 28 is smaller thereby resulting in a faster water discharge speed for a given mass flow rate. A retracted nozzle plug 62, as shown in phantom, opens the area of throat 28 to a larger area and thus lowers water discharge speed for the same given mass flow rate. A plug position control mechanism including pressure sensors, such as pitot tubes 66 and 68, provide balanced pressure settings in a piston drive head 64 to attain optimum positioning of nozzle plug 60 in relation to speed, loading, or other parameters of the vessel.

When deployed in marine applications, steering may be accomplished by redirecting the water jet at the discharge nozzle. In the embodiment of FIG. 1, the device 10 may include thrust reversers on each side thereof in the form of a deflector 52 hydraulically actuated by cylinder 55 and control arm 56. When driven to a reverse position to seal off the throat 28 by engaging the head of plug 60, as shown by deflector 53 (shown in phantom), fluid flow is redirected from region 22 and is forced in a direction 58 (also shown in phantom). When corresponding deflectors are provided at four quadrants of outlet 18, simultaneously actuating the deflectors to a reverse position produces a reverse thrust to reverse the direction of travel of the vessel. Respective deflectors on left and right sides of the vessel may be independently operated to provide steering. In addition, the discharge region of device 10 may be mounted on a gimbal to effect redirection of thrust to provide steering.

Figure 2:
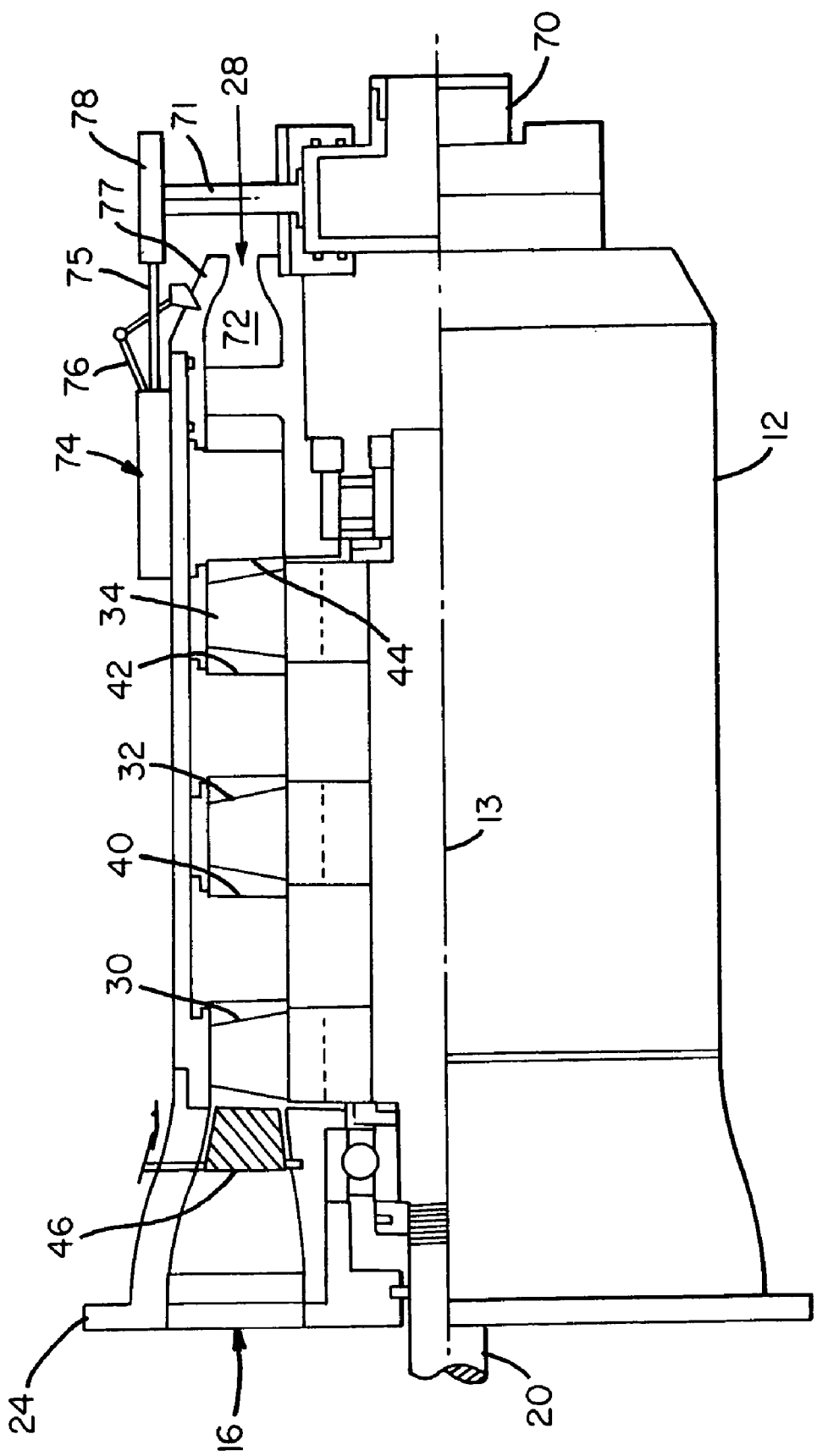
FIG. 2 depicts a partial cut-away view that shows further details of the steering jet assembly of the multistage device of FIG. 1 according to a further aspect of the present invention.

The embodiment of FIG. 2, in which like reference numerals indicate like elements of FIG. 1, shows an alternative steering arrangement where a secondary jet nozzle 70 coupled to steering wheel 78 via shaft 71 is controllable through an azimuth of 180 degrees. Steering is effected by actuating cylinder 74, which drives arm 75 to turn wheel 78. In this case, water under pressure is ported from just upstream of the nozzle discharge 72 into a chamber connecting with a "tee" shaped mechanism, which is controllable through 180 degrees. FIG. 2 also shows an alternative mechanism including actuating arm 76 that drives hinged flange 77 to vary the discharge nozzle area, and consequently, to vary the water discharge speed through throat 28.

FIG. 3 shows another embodiment of a pumping or propulsion device in which, rather than providing "fixed pitched" stator vanes 30, 32, 34 (FIG. 1), variable pitch stator vanes 80 and 82 are provided. Control arms 85, 89 control the effective pitch of vanes 80, 82 upon tangential translation of linkages 83, 87. A control ring (not shown) actuates linkages 83, 87 when rotated upon the outer casing 12. The stator vanes may be segmented into a stabilizer section 92 and a trailing section 90 that about a shaft 91, as depicted in FIG. 4. Shaft 91 is preferably integrally formed with trailing section 90 of the stator vane. In the exemplary embodiment, trailing section 90 is designed to pivot plus or minus 30%, more or less, about a neutral position. About twelve to fourteen stator vanes 80 are circumferentially and evenly spaced within the annular chamber 19, which extend radially from axis 13 from about 3.0 inches to about 4.5 inches. A similar or smaller number of rotor blades may be used on each wheel.

In the exemplary embodiment, the outer radius of the wheels, such as wheel 45, defines the inner surface of annular chamber 19 at about 3.0 inches from axis 13 while the outer radius of chamber 19 is about 4.5 inches from axis 13. Preferably, the height of the rotor blades and stator vanes is about 1.5 inches and the ratio of blade or vane height to its cord is about 1:1 or higher. The ratio of blade height to drum radius in the exemplary embodiment is preferably between 0.66 and higher, i.e., a blade height of at least $\frac{2}{3}^{rd}$ the drum radius, or more. None of these exemplary dimensions, however, constitutes a limitation of the invention. This exemplary embodiment was driven with a 1250 horsepower engine at a propulsive efficiency exceeding 84 to 86%. When used to pump water in other applications, the exemplary embodiment was able to pump water over six hundred and fifty feet vertically at a flow rate of about 8500 gallons/minute.

Instead of using a segmented vane structure, vanes 80, 82 may take on the form 86, as depicted in FIG. 5, which is constructed much like a standard airfoil having a single section 95 that pivots about a shaft 93. Shaft 93 is preferably integrally formed with vane 95.

The material of the vanes and stator may comprise any of a variety of materials known in the art such as titanium, bronze, a high carbon stainless steel, a composite material, or other material that is preferably non-corrosive and/or adapted for marine applications.

In addition, there is provided a "fixed pitch" exit guide vane 84 (FIG. 3) that is fixedly attached to wall 11 of housing 12.

Figure 6:
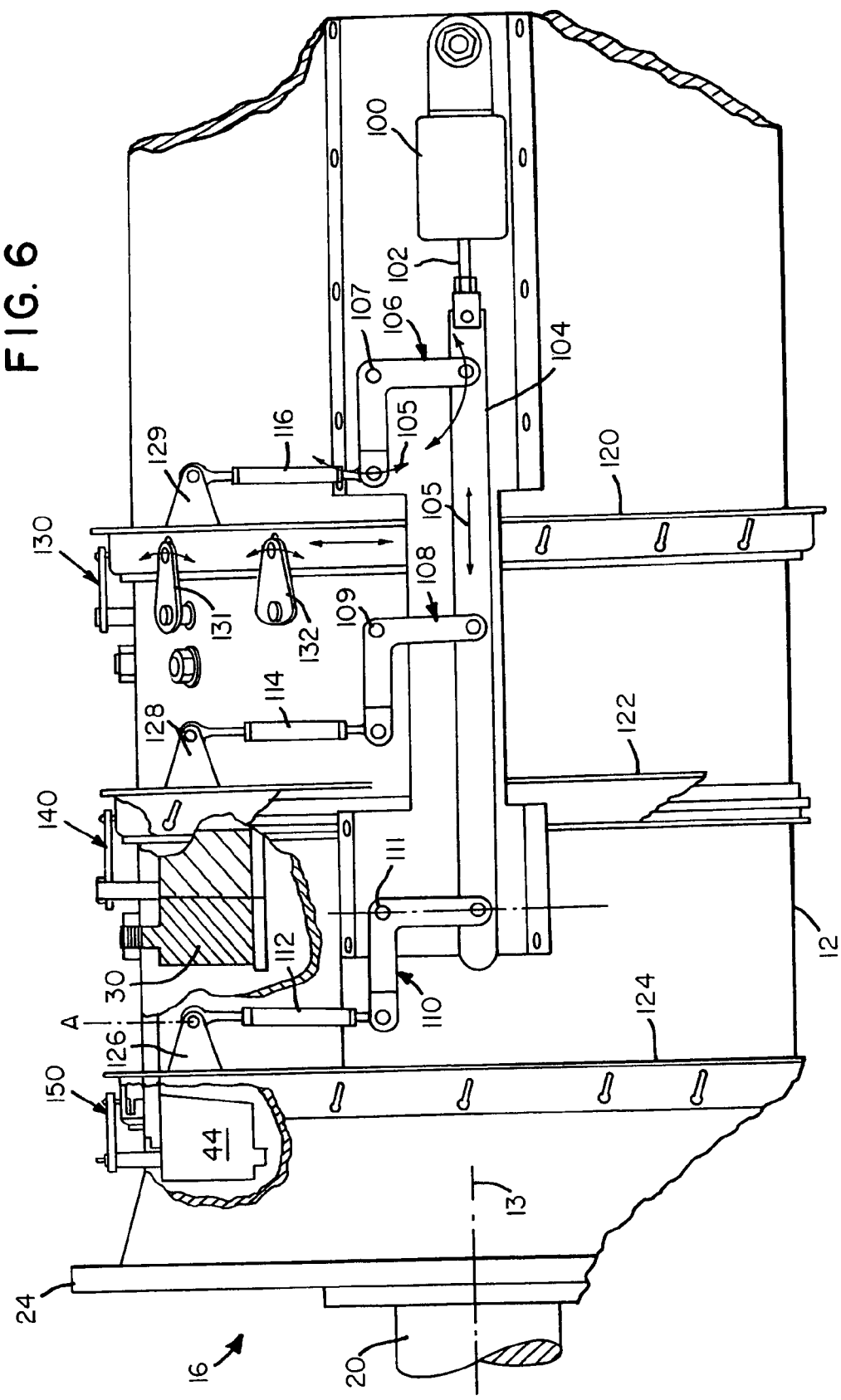
FIG. 6 depicts actuator and control mechanisms that may be incorporated in a multistage pumping or propulsion device to control variable inlet guide vanes and/or the pitch of stator vanes according to yet other aspects of the present invention.

FIG. 6 illustrates one type of mechanism to vary the pitch of stator vanes according to the variable pitch stator vane aspect of the invention where an actuator 100 under manual or automated control includes an actuator rod 102 that translates control arm 104 in direction 105 parallel to axis 13. A series of L-shaped linkages 106, 108 and 110 interconnect control arm 104 with respective pitch actuating turnbuckles 112, 114, and 116 to vary the pitch of inlet guide vane 46 as well as the pitch of a series of stator vanes, one of which is shown at 30. Turnbuckle 112 couples control ring 124 via flange 126, turnbuckle 114 couples control ring 122 via flange 128, while turnbuckle 116 couples control ring 120 via extension 129. The turnbuckles include a threaded adjustment rod that may be adjusted to properly align the pitch angle of the stator vanes and inlet guide vane relative to each other. Upon translation of control arm 104 in an axial direction, the trailing portion of variable pitch stator vane 30 (shown in cut-away view) changes pitch by pivot action of linkage 108 about pivot point 109. This action drives control ring 122 circumferentially around casing 12 via connecting flange 128. Circumferential movement of control ring 122 turns the stator vane 30 via arm 140. As indicated above, a preferred embodiment varies the angular pitch of stator vane 30 (or trailing portion thereof) by plus or minus twenty degrees. A similar action occurs with respect to control ring 120 to actuate the lever 130 to vary the pitch of the interconnected stator vanes underneath casing 12 (not shown). Levers 131 and 132, which are ganged to control ring 120 with other levers, similarly vary the pitch of interconnected stator vanes.

As apparent from the illustrated actuating mechanism, control of the stator vanes and the inlet guide vane 46 occur in unison for simultaneous pitch angle changes. Pitch angle changes alter the angle of attack of, and hence, the torque applied against or energy delivered to the working fluid by the rotor blades of the following section. Each rotor section thus stepwise increases the energy imparted to the working fluid. Control of the inlet guide vanes of ring 124 may, however, be separated from control of the stator vanes of rings 120 and 122. As control arm 104 axially translates, linkage 110 pivots about pivot point 111 to advance and retract turnbuckle 112, which drives control ring 124 via flange 126. Control ring 126 couples the shaft of inlet guide vane via actuating arm 150. Preferably, actuator 100 is controlled in a way to attain peak power output or peak propulsive efficiency of the pumping device as working fluid enters the inlet 16.

Thus, according to the structure of FIG. 6, the rotors are fixed pitch while the stators are variable pitch. The pitch-changing mechanism is simple in design, construction, and maintenance.

Figure 7B:
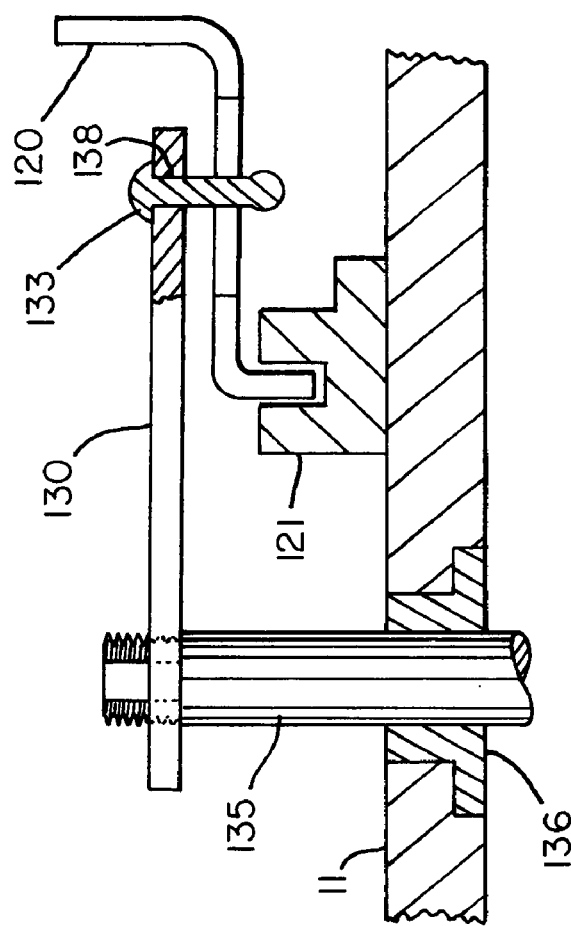
FIG. 7B shows a side view of slip ring and control arm mechanism to vary the pitch angle of stator vanes according to an aspect of the present invention.
Figure 7C:
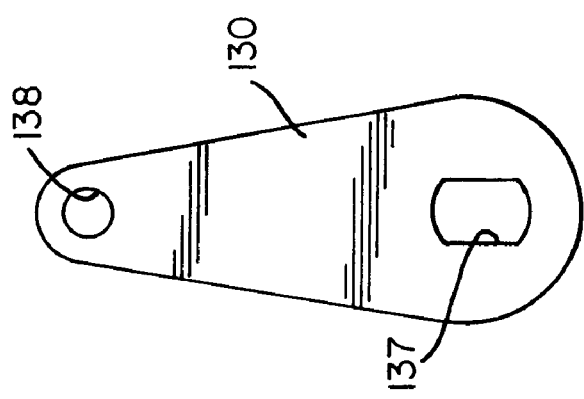
FIG. 7C is a plan view of a control arm of FIG. 7 that controls the pitch angle of the stator vanes.

FIG. 7A depicts one of the control or actuator rings, i.e., actuator ring 120, in greater detail. As apparent, upon actuation of hydraulic or electrical actuator 104, angled link 106 rotates about a pivot point 107 to effect a vertical excursion of turnbuckle 116 which, in turn, circumferentially rotates actuator ring 120 around casing 12 to alter the pitch angle of the stator vanes, e.g., stator vanes mechanically coupled with control arms 130, 131, and 132 of FIG. 6. FIG. 7B shows stator vane control arm 130 in operative relation with actuator ring 120 and shaft 135 of a variable pitch stator vane. There, a slot in guide block 121 enables the actuator ring 120 to circumferentially rotate when actuated by turnbuckle 116 (FIG. 6) that, in turn, sweeps the end of control arm 130 through slot 134 via locking pin 133 extending through hole 138 of control arm 130. This action effects rotation of shaft 135, which is interlocked with control arm 130 via inset 137, as further illustrated in FIG. 7C. Bushing 136 confines shaft 135 to an axial position and seals water pressure inside casing 11.

Figure 8:
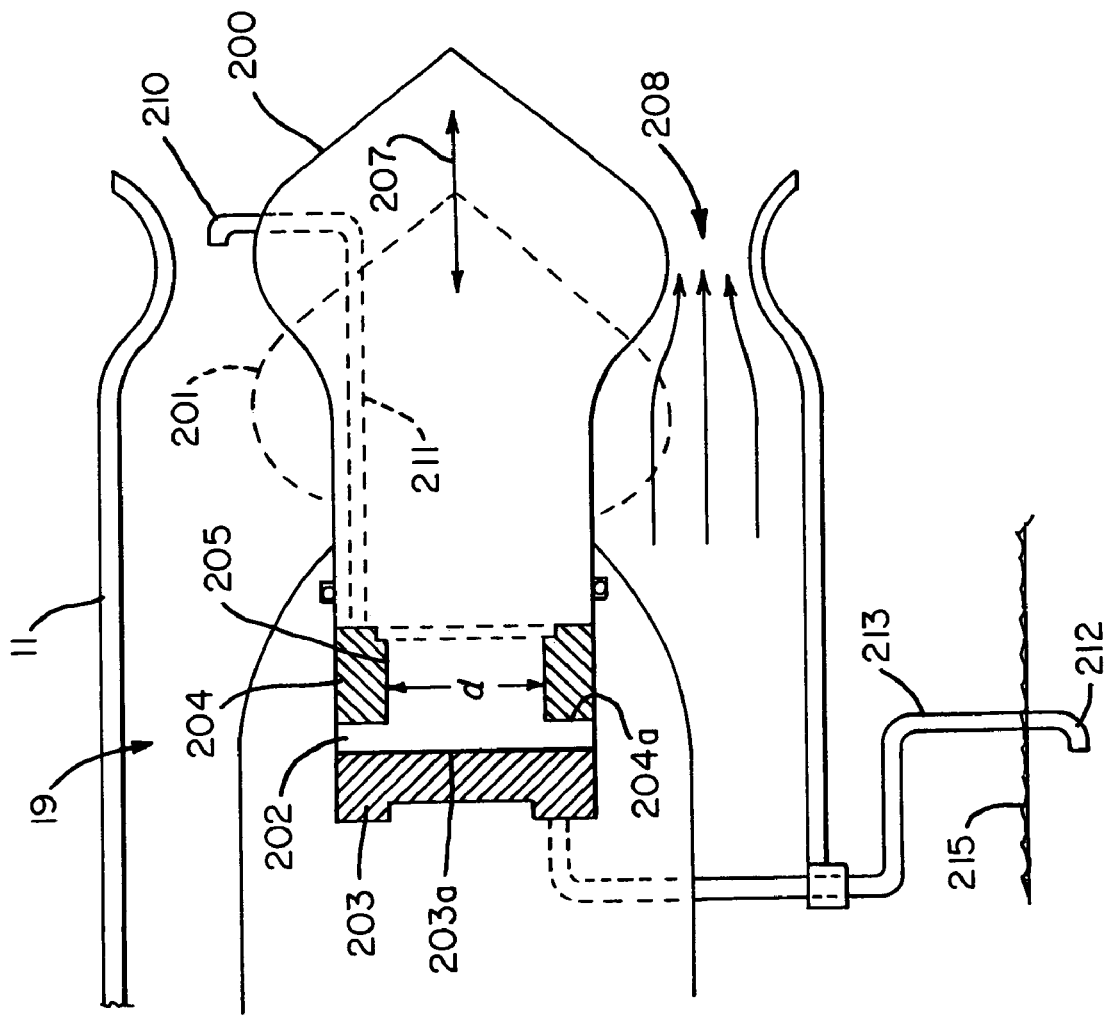
FIG. 8 shows a piston-cylinder drive mechanism and pressure balancing system to vary the discharge area of the multistage propulsion device in accordance with sensed jet velocity and speed of the vessel in the water, according to yet a further aspect of the present invention.

FIG. 8 illustrates yet an addition aspect of the invention, which is designed to optimally match boat speed with water jet speed when deployed in marine applications. The apparatus and method may be used to automatically or manually control the throat of the discharge nozzle by altering the axial position of nozzle plug 60 to attain optimum propulsive efficiency according to boat speed and water jet speed. In determining how such control is to be implemented, sea level static thrust=W/g*V. The net thrust of a vessel underway, however, is characterized by:

$$\text{Thrust } T = W/g * (V_j - V_b) \quad (1)$$

where thrust T=mass flow rate in weight of working fluid (i.e., water) per unit volume per second, g=gravitational acceleration constant (e.g., expressed as 32 ft/sec$^2$), velocity Vj=exit velocity of the fluid jet at the discharge nozzle, and velocity $V_b$=exit velocity of the vessel relative to the water. The exit velocity exerts a dynamic pressure $P_d$ equal to ½ the density Rho of the working fluid times the velocity squared divided by two times the acceleration of gravity, or $$P_d = (Rho * V^2)/2g \quad (2)$$

It is known that dynamic pressure $P_d$ at the discharge nozzle is directly proportional to the velocity squared $V^2$ of the fluid. Propulsive efficiency (Np) equals the useful thrust output divided by the combination of useful thrust output and losses (e.g., frictional losses). So, if Vb represents the velocity of boat and Vj represents the velocity of the water jet at the discharge nozzle, then the Absolute (or effective) Discharge Velocity Va equals Vj−Vb. Therefore, propulsive efficiency $$Np = ((W/g) * Va * Vb) / \{(W/2g) * (V_j^2 - V_b^2)\} \quad (3)$$

Simplifying the expression of Np, then $$Np = 2/(1 + Vj/Vb) \quad (4)$$

Therefore, it is seen that the propulsive efficiency Np is indirectly proportional to the ratio of the water jet and boat velocities. Propulsive efficiency Np is also proportional to the ratio of the dynamic pressures generated by the jet and boat velocities, i.e., Np≅Pd (jet)/Pd (boat). Using equation (4) above, the propulsive efficiency Np is 67% for a hull design speed of 30 knots at a water jet speed of 60 knots.

FIG. 8 illustrates one type of mechanical arrangement to capture these relationships and control nozzle discharge area, or the speed of the water jet in relation to boat speed. The fluid discharge area is defined by throat 208, which is confined by head 200 of the nozzle plug and the internal walls of casing 11 at the throat area. Nozzle head 200 axially moves in a direction indicated by line 207 to alter the effective area of throat 208, which extends within an annular path of chamber 19. A first pitot sensor 210 senses pressure of the working fluid in throat 208 while a second pitot tube 212 senses pressure of the water in the hull ship stream that is exerted by boat speed. Pitot tube 212 extends downwardly below water level 215 and opens to the direction of travel of the vessel. A line 211 communicates sensed pressure of pitot tube 210 with nozzle head retraction chamber 204. Flex line 213 communicates pressure sensed by pitot tube 212 with nozzle head extension chamber 203. In chambers 203 and 204, which are preferably cylindrical in construction, forces acting upon opposing sides of preferably cylindrical piston 202 are measured by pressure times the area of respective surfaces 203a and 204a. In a circular piston, a circle defines area 203a whereas concentric circles define area 204a. Piston 202, however, may be non-circular. Thus, the respective velocities of water sensed by the pitot tubes 210 and 212 are translated to opposing forces acting on opposing sides of piston 202, which is mechanically coupled to or integrally formed with nozzle head 200.

A balance in the opposing forces is achieved when the individual products of pressure and area equalize, which drives piston 202, and consequently nozzle head 200, to an equilibrium position (e.g., from position indicated by phantom nozzle 201) thereby providing a mechanism and method to optimize water jet speed for a given boat speed, assuming the operator has knowledge of characteristics of the boat, e.g., optimum hull speed. In mechanical construction, the diameter d of neck 205 defines the areas of respective surface 203a and 204a, which due to their respective areas automatically effects equilibrium at the appropriate nozzle head position. In the exemplary device, the area of surface 203a is 1.88 times the area of surface 104a.

To automatically control or override the pressure-driven equilibrium position of nozzle head 200, automated computer control may be implement to actuate servos according to sensed pressure at pitot tubes 210 and 212, or conventional transducers and amplifiers may be deployed to produce appropriate control signals to drive a servo or actuator. Instead of using pitot static pressure, the axial position of nozzle 200 in larger propulsion devices may be electrically or hydraulically actuated. In addition, a pressure regulator may be interposed on either or both lines 211, 213 (or elsewhere) to alter the equilibrium position of or control piston 202.

FIGS. 9A through 9D show an exemplary rotor blade design that may be used with the illustrated pumping or propulsion device. Stator vanes may have a similar blade construction, but incorporating a shaft as shown by FIGS. 4 and 5. The illustrative rotor blade of FIGS. 9A and 9B includes a base 300 having a curved head 304 to support blade 302. According to an aspect of the invention, particularly in connection with the stator vane design, blade 302 has a thin or sharp trailing edge 306 so that an area of the flow path that is normal to fluid flow expands as fluid travels from leading edge 308 to trailing edge 306 of blade 302. Preferably, blade 302, head 304, and base 300 are integrally formed of non-corrosive material, such as stainless or high carbon steel, bronze, or other materials known in the art. In relation to the central rotor axis 13 (FIG. 1), the height of the exemplary blade at equally spaced points A–F from head 304 to the outer tip 310 (FIG. 9C) are 5.93136, 6.67501, 7.41866, 8.162308, 8.905955, and 9.6436023 inches. FIG. 9C shows the relative twist of the exemplary blade and FIG. 9D shows the cross-sectional geometry of the blade from its leading edge 308 to its trailing edge 306. As known in the art, increasing the radius ratio (i.e., the ratio of blade height to tip radius) decreases blade efficiency. Such losses stem from differential pressures between the root and tip of blade 302, which result from an increased tip velocity of the blade relative to the working fluid.

Figure 10:
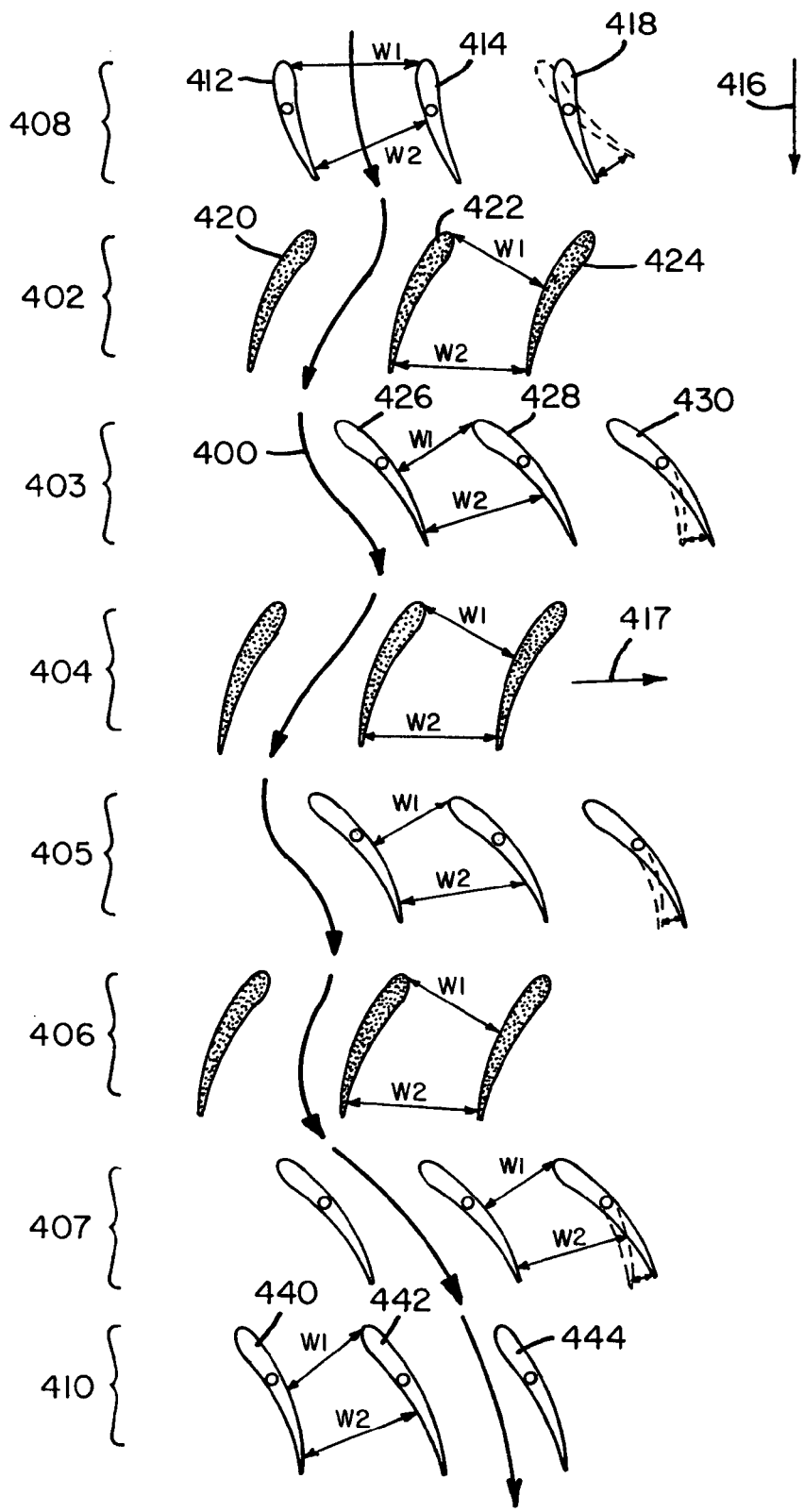
FIG. 10 is a conceptual view of a series of rotor-stator sections of a three-stage pumping or propulsive device that optionally includes a set of inlet guide vanes and a set of exit guide vanes

FIG. 10 illustrates exemplary blades and vanes of a three-stage device where working fluid travels in direction 416 through the device upon rotation of the rotor blades in direction 417. As depicted, the three stages comprise rotor-stator section stages 402–403, 404–405, and 406–407. Only a couple of blades or vanes are shown in each section, which is conceptually represented by cross-cuts at a mean blade or vane height. To simplify the illustration, blade or vane twist is not shown in the illustration.

The illustration of FIG. 10 includes an optional, variable-pitch inlet guide vane stage 408, as well as an optional, fixed-pitch exit guide vane stage 410 that straightens the flow of the working fluid prior to discharge. In a preferred structure, it is desired to obtain at each stage a ratio of inlet velocity $V_1$ to exit velocity $V_2$ of about 1.15 to 1.50 where $$V_1/V_2 = 1.15 \text{ to } 1.50 \qquad (5)$$

Due to a decreasing area of the flow path between the inlet guide vanes 412, 414 and 416, which define the respective flow paths, the velocity of the working fluid for a given mass flow rate increases as it flows through section 408. As seen, the cross-sectional area between inlet guide vanes 412 and 413 decreases in downstream direction 416 because the vane geometry provides a wider width W1 at its section entry and a narrower width W2 at its section outlet. The cross-sectional area of the flow path between vanes is measured by width multiplied by vane height, assuming the guide vanes have the same twist angle and constant height throughout the section. As measured in a plane normal to flow path 400, the area of the flow path between the vanes decreases in the downstream direction. According to an aspect of the invention, the flow path area between the inlet guide vanes can be altered by changing the pitch angle of the inlet guide vanes, as shown by exemplary vane 418, for example.

As known in the art, total or absolute pressure of the working fluid in an axial flow device includes two components, i.e., a ram or impact pressure component and a static pressure component. The rotor blades impart ram or impact pressure to the fluid. Static pressure is ambient. Assuming total or absolute pressure remains constant throughout the inlet guide stage, an increase in fluid flow speed after passage through the inlet guide stage 408 necessarily decreases the static pressure component of the working fluid if total pressure is to remain the same. Thus, the variable inlet guide vanes enable altering of pressure and whirl angle of the fluid before entering the first rotor stage. This provides an additional level of control of the performance of the pumping or propulsion device.

In stages 402–410, however, the area of the flow passage between rotor blades and stator vane increases from an entry point to an exit point of each section thereby decreasing the speed of the work fluid as it flows through the pumping or propulsion device. In the succeeding stages 402–410, the width W1 at the entry point between rotor blades 422 and 424 is less than the width W2 at the exit point of these blades—resulting in expanding flow path area when blade height is constant in the direction of axis 13. Likewise, the width W1 at the entry point between stator vanes 426 and 428 is less than the width W2 at the exit point of these vanes—resulting in expanding flow path area when vane height remains constant in the direction of axis 13. A similar decrease in working fluid velocity occurs in stages 404–410. Given a constant overall mass flow rate through the pumping or propulsion device, it is seen that the velocity of the working fluid decreases at each section. The decreased velocity over the succeeding stages also lowers internal frictional and eddy flow losses (which exponentially increases with speed) that are typically encountered in axial flow devices, thus further improving efficiency.

Advantageously, the difference in magnitude of W1 and W2, and consequently the relative entry and exit speeds as well as the extent of whirl of the working fluid when passing the stator section, may be changed by altering the pitch angle of the stator vanes 426 and 428, as indicated by variable pitch stator blade 430. Changing the angle of attack of the fluid prior to the rotor stage, i.e., changing the amount of whirl, alters the load placed on the engine, or energy imparted to the fluid. Thus, this aspect of the invention substantially improves the overall operating efficiency at various operating set points of the vessel, or at various engine speeds, torque or power. Although W1 and W2 designate entry and exit point width of each section shown in FIG. 10, these lengths may differ between or among or within the stages or sections without departing from the scope of the invention. Blade or vane twist may also differ among stages, sections, or even within a stage or section. In addition, concentric cylinders substantially, i.e., the internal wall of the outer casing and the exterior surface of the rotor blade wheel, define the illustrated annual chamber of the pumping or propulsion device but other geometries may also be employed to define a suitable flow path.

The exit guide vanes 440, 442, and 442 serve to straighten fluid flow at the discharge nozzle. Their pitch angle may be fixed or variable. A mechanism similar to that use to vary the stator vanes may be employed to vary the pitch angle of the exit guide vanes. This provides an additional layer of control.

As apparent, the invention allows control of thrust either by controlling mass flow via inlet guide vane position, by altering the pitch of the stator vanes (in the variable pitch embodiment of the invention) and thus the pressure imparted to the fluid by each rotor section, by altering the discharge nozzle area or jet velocity to optimally match boat and water jet speed, or any combination thereof, for any given horsepower, torque, or drive speed applied to a multistage axial flow pump or propulsion device. Since it is desired to operate most turbine or piston engines (diesel or gasoline) at an maximum power, at maximum fuel efficiency, at an optimum constant engine speed for best hull speed or power output, or on an optimum performance curve, inlet guide vane throttling (to control mass flow) and/or discharge jet velocity may advantageously be adjusted at the will or desire of the shipmaster to meet any varied performance characteristics of the vessel. The inlet guide vanes may be configured to rotate plus or minus thirty degrees, more or less, from a neutral position. This way, mass flow is positively controlled independent of the speed of the vessel.

For a long haul, the shipmaster may desire to operate on a best speed-range curve to travel the known distance in the shortest time. In other situations, the shipmaster may desire to travel the farthest distance given the amount of fuel onboard. In yet other situations, the shipmaster may desire to travel at the highest speed given the available horsepower, loading of the vessel, and/or design speed of the hull. The present invention meets all of these demands.

Moreover, the invention may be deployed to drive displacement or hydroplaning hulls, or in hydrofoil or submarine applications. The invention may also be deployed in water or fluid pumping applications to pump the greatest amount of water at the highest pressure for a given horsepower input, or to throttle the amount of water delivered by a pumping station. Thus, the invention embraces all such modifications and adaptations that may come to those skilled in the art in view of the teachings herein.

The invention claimed is:

1. An axial flow device comprising:
   a housing, a substantially annular chamber within said housing to convey a substantially incompressible working fluid from an inlet to an outlet, said chamber including at least two stages that each include a rotor section and a stator section, said rotor section including a multi-bladed drive wheel positioned downstream of said inlet and operative to rotate around an axis to drive working fluid from the inlet to the outlet, and said stator section being positioned downstream of the rotor section and including plural vanes substantially fixed relative to said housing and geometrically arranged to define a flow path having a cross-sectional area between vanes that increases from an entry point to an exit point of the stator section.

2. The device of claim 1, wherein said stator vane are variable in pitch and operative as a flow straightener of said working fluid or to adjust the angle of attack of the working fluid upon entry into a following rotor section.

3. The device according to claim 1, wherein said outlet comprises a convergent annular chamber at a discharge nozzle whereby to increase velocity of liquid discharged from said outlet.

4. The device of claim 3, wherein said convergent annular chamber includes a variable throat area positioned immediately upstream of said outlet to vary the velocity of the liquid discharged from said outlet.

5. The device of claim 4, further including an actuator to vary the axial position of a nozzle plug whereby to vary effective area of said outlet.

6. The device of claim 4, further including balancing pistons operated by pressure differentials obtained by sensing discharge nozzle jet velocity and vessel velocity respectively to obtain a desire optimum discharge velocity relative to vehicle velocity.

7. The device of claim 6, further including a nozzle plug position override effective to reposition said nozzle plug by overriding automatic positioning of said balancing pistons with hydraulic pressure.

8. The device of claim 1, further including at least one variable inlet guide vane positioned downstream of said inlet and operative simultaneously to change inlet area and whirl of liquid entering said inlet.

9. The device of claim 1, further comprising a fixed set of inlet guide vanes position downstream of said inlet to adjust inlet whirl angle of liquid entering said inlet.

10. The device of claim 9, further comprising an inlet diffuser serving as an inlet duct positioned upstream of said inlet guide vanes.

11. An axial flow device to propel a vessel through water, said device comprising:

an axial flow casing having a rotor axis, said casing being fixedly mounted within said vessel, an annular chamber within the casing to convey water from an annular inlet to an annular outlet, said chamber including multiple stages that each include a rotor section and a stator section, said rotor section including a multi-bladed drive wheel positioned downstream of said inlet and operative to rotate upon said axis of the casing and drive water from the inlet to the outlet, said stator section positioned downstream the rotor section and including plural vanes fixedly attached to said casing at spaced locations within the annular chamber, said stator section including plural vanes at spaced locations within the chamber to define flow passages between respective vanes each having a cross-sectional area normal to a direction of flow that increases from an entry point to an exit point of the stator section, and a variable area discharge nozzle responsive to discharge velocity of water and velocity of the vessel to alter the area of discharge according to a desired operating set point.

12. The axial flow device of claim 11, wherein said stator vanes have variable pitch.

13. The axial flow device of claim 11, wherein said annular inlet includes a variable inlet guide vane stage that includes plural variable pitch vanes.

14. A method of conveying a substantially incompressible working fluid in an axial flow device comprising:

defining a flow path in the axial device to convey working fluid from an inlet to an outlet, providing multiple stages within said flow path that each include a rotor section and a stator section that follows said rotor section, driving working fluid through said flow path by rotating the rotor section, and lowering the speed of working fluid by providing increased flow path areas between vanes of the stator section as working fluid travels from the inlet to the outlet.

15. The method of claim 14 wherein said inlet includes variable inlet guide vanes having controllable pitch and said method further including throttling fluid flow at said inlet by altering the pitch of said inlet guide vanes.

16. The method of claim 14 wherein said outlet includes an exit guide vane stage operative to straighten flow of said working fluid and increases static pressure prior to discharge.

17. A method of controlling discharge velocity of water discharged from an axial flow device relative to water speed a vessel, said method comprising:

detecting discharge velocity of water discharged from the axial flow device, detecting water speed of the vessel, providing a discharge nozzle in said axial flow device having a variable area throat, and utilizing said discharge velocity and boat velocity to control the area of said throat according to a desired set point based on the discharge velocity of the water and the speed of the vessel.

18. The method of claim 17, further comprising providing an actuator that drives the discharge nozzle, said detecting steps includes detecting respective pressures associated with said discharge velocity and water speed of the vessel, and said utilizing step includes using the respective pressures to drive said actuator to an equilibrium position that defines a desired optimum throat area of the discharge nozzle.

* * * * *